July 24, 1956 — J. W. BEGLEY — 2,756,030
IMPROVED PEBBLE HEAT EXCHANGER
Filed July 25, 1952
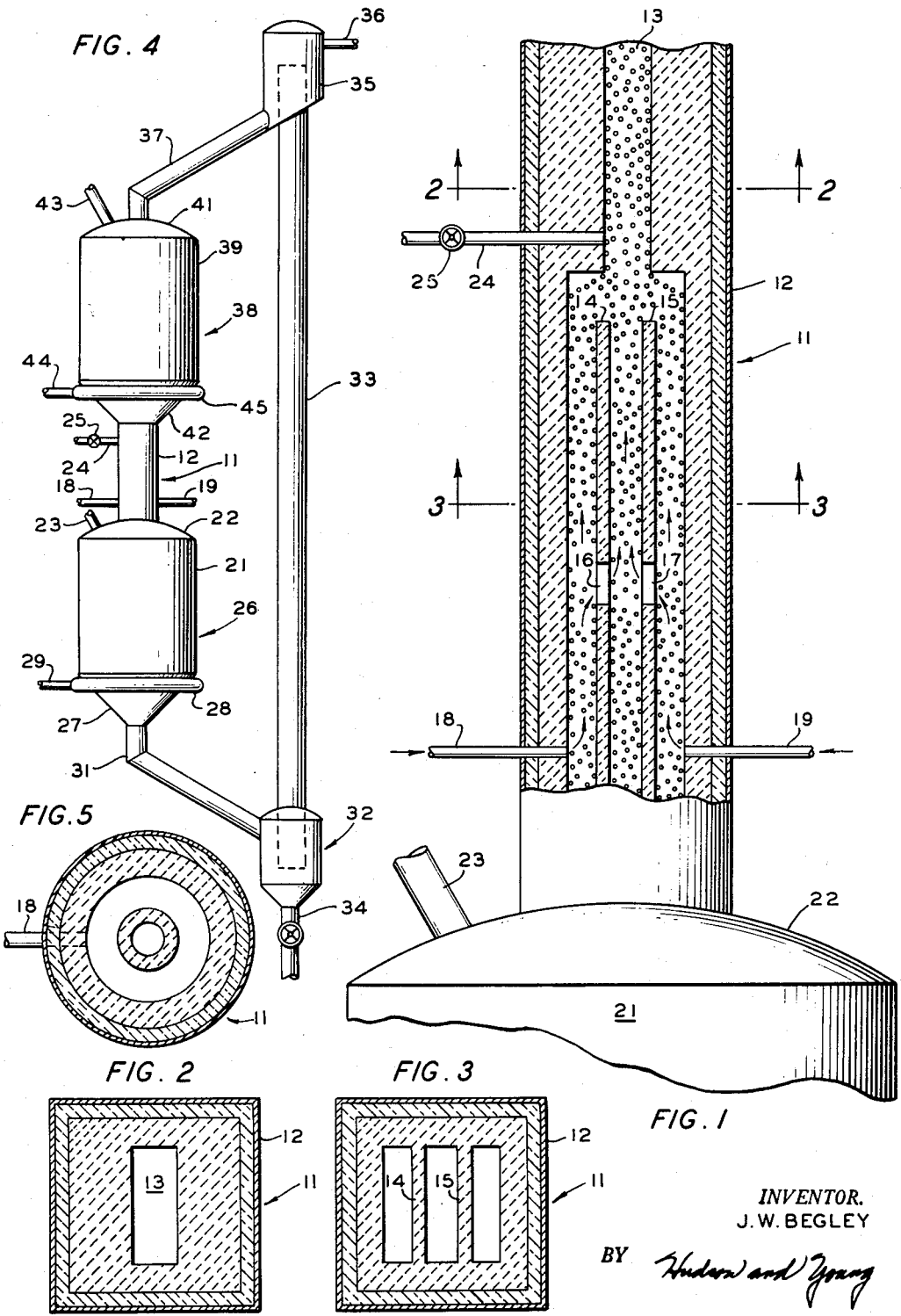
INVENTOR.
J. W. BEGLEY
BY Hudson and Young
ATTORNEYS United States Patent Office 2,756,030
Patented July 24, 1956

2,756,030

IMPROVED PEBBLE HEAT EXCHANGER

John W. Begley, Bartlesville, Okla., assignor to Phillips Petroleum Company, a corporation of Delaware Application July 25, 1952, Serial No. 301,004

6 Claims. (Cl. 257—55)

This invention relates to pebble heater apparatus. In one of its more specific aspects, it relates to improved pebble transfer means between the lower portion of a pebble heater chamber and the upper portion of a reactor chamber. In another of its more specific aspects, it relates to an improved pebble throat. In another of its more specific aspects, it relates to means for obviating temperature gradients across pebble masses gravitating through the pebble throat between the pebble heater chamber and the reactor chamber.

Apparatus of the so-called "pebble heater" type has been utilized in recent years for the purpose of heating fluid to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form, having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about one inch in diameter. In a high temperature process, pebbles having a diameter of between ¼ inch to ⅜ inch are preferred. The pebbles must be formed of refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons, such as ethane or propane, the pebble temperature in the reaction chamber is usually in the range of 1200° F. For the production of acetylene by pyrolysis of hydrocarbons, temperatures in the range of 1600° F. to 3000° F. are desirable.

One disadvantage of conventional pebble heater apparatus, in which heating material is introduced at the periphery of a pebble heater chamber and a single pebble throat is utilized for transferring pebbles from the lower portion of that pebble heater chamber to the upper portion of a reactor chamber, is that a temperature gradient exists across the pebble mass gravitating through the pebble throat. When these pebbles are distributed within the reactor chamber, a distinct and considerable temperature gradient exists across the pebble bed formed within the reactor chamber. Gaseous materials which are contacted with the hot pebbles within the reactor chamber are raised to different temperatures by reason of the temperature gradient across the pebble bed. Non-uniform reaction of the gaseous material results from this type of operation.

Each of the objects of this invention is obtained by at least one aspect of this invention.

An object of this invention is to provide improved means for obviating temperature gradients across the mass of pebbles gravitating through pebble throats of pebble heater apparatus. Another object of this invention is to provide an improved pebble throat for pebble heater apparatus. Another object of this invention is to provide means for supplying pebbles to the upper end portion of a reactor chamber at a substantially uniform temperature. Another object of this invention is to provide means for controlling the temperature of pebbles supplied to the reactor chamber of pebble heater apparatus. Another object of this invention is to provide a method for obtaining more uniform cracking of hydrocarbon materials in a pebble reactor chamber. Other and further objects of this invention will be apparent upon study of the accompanying disclosure.

Broadly speaking, this invention comprises an improvement in pebble throats between the pebble heater chamber and the reacter chamber in pebble heater apparatus. This improvement comprises dividing the pebble throat into a plurality of upright sections so as to divide the pebbles flowing through the pebble throat as a contiguous pebble mass into such a plurality of pebble portions, generally being at materially different temperatures. Openings are provided between the plurality of pebble passages at points intermediate their ends so as to permit the flow of heating gas from one section thereof to the other.

Better understanding of this invention will be apparent upon study of the diagrammatic drawings in which Figure 1 is a vertical section of a pebble throat embodying the invention.

Figure 2 is a horizontal cross section taken along the line 2—2 of Figure 1.

Figure 3 is a horizontal cross section taken along the line 3—3 of Figure 1.

Figure 4 is a schematic view of a pebble heater apparatus.

Figure 5 is a plan view of a throat with a circular inner wall.

Referring particularly to the device shown in Figure 1 of the drawings, pebble throat 11 comprises an upright elongated shell 12, the upper portion of which is provided with a single central passage 13 longitudinally disposed therein. The upper end portion of throat 11 is connected to the lower end portion of a pebble heater chamber, not shown. In an intermediate portion of throat 11, passage 13 is divided by wall sections 14 and 15 into three throat sections, communication between the three throat sections being provided at the upper ends of walls 14 and 15. Walls 14 and 15 are provided with openings 16 and 17 intermediate their ends, preferably about midway of their lengths. As illustrated in Figure 5, pebble throat 11 may be provided with a circular inner wall in which case passage 13 is divided into two throat sections, i. e., an inner and an outer section, rather than into three throat sections as shown in Figure 3. Heating material inlet conduits 18 and 19 extend into the outer passageway portions formed between the wall of shell 12 and walls 14 and 15, respectively. The lower end portion of throat 11 is connected to the upper end portion of shell 21 preferably being centrally located in upper closure member 22 of that chamber. Gaseous effluent outlet conduit 23 extends from the chamber formed within shell 21, preferably through closure member 22. Gaseous material outlet conduit 24, having flow control valve 25 positioned therein, is in some cases provided in throat 11 above the enlarged portion of passageway 13.

Referring particularly to device shown in Figure 4 of the drawings, those elements described in connection with Figures 1, 2, and 3 are identified by like numerals. Lower chamber 26 comprises upright elongated shell 21, closed at its upper and lower ends by closure members 22 and 27, respectively. Gaseous material inlet means comprises header member 28 encircling at least a portion of the lower end of shell 21, preferably closure member 27. Gaseous material inlet conduit 29 is connected to header member 28 so as to supply gaseous material thereto. Pebble outlet conduit 31 extends from the lower end of chamber 26 and is connected at its lower end portion to the upper end portion of pebble entraining chamber 32. Pebble entraining chamber 32 encloses the lower end portion of elevator conduit 33. Lift gas inlet conduit 34 is provided in the lower end of pebble entraining chamber 32 and is preferably coaxially disposed with respect to elevator conduit 33. Gas-pebble separator chamber 35 surrounds the upper end portion of elevator conduit 33 and is provided in its upper end portion with gaseous effluent conduit 36. Pebble conduit 37 extends downwardly from the lower end of chamber 35 to the upper end of pebble heater chamber 38, chamber 38 comprising upright elongated shell 39 closed at its upper and lower ends by closure members 41 and 42, respectively. Gaseous effluent conduit 43 extends from the upper end portion of shell 39, preferably through closure member 41. Heating material inlet means comprising conduit 44 and header member 45 are connected to the lower end portion of chamber 38, encircling at least a portion of that chamber at its periphery and communicate with the chamber formed within shell 39, preferably through bottom closure member 42. Throat 11 extends from the bottom end of chamber 38 to the upper end portion of chamber 26.

In the operation of conventional pebble heater devices where hot combustion gases are introduced to the pebble bed in a pebble heating chamber through ports around the periphery thereof, it has been concluded that a temperature gradient of firing temperature to pebble inlet temperature exists across the pebble bed as it enters the pebble throat shown in Figure 1. In conventional operation of pebble heater devices, a gaseous material is normally introduced into the pebble throat intermediate the two chambers in a sufficient quantity to prevent reaction products from flowing through the pebble throat from the reaction chamber to the pebble heating chamber and to prevent heating materials, such as combustion products, from flowing through the pebble throat from the pebble heating chamber to the reaction chamber. One gaseous material conventionally utilized as the inert gaseous material in sealing the pebble throat against flow of other gases therethrough, is steam. Steam can also be utilized as the heating material in the pebble throat of this invention. Hydrogen, which has a high specific heat can alternatively be used, if desired.

Pebbles are introduced into the upper end portion of heating chamber 38, forming a contiguous gravitating mass therein. Gaseous heating material is introduced into the lower portion of chamber 38 through conduit 44 and header member 45. The gaseous heating material may be in the form of preheated gaseous materials or may be in the form of fuel and air, which materials are burned within the lower end portion of chamber 38 so as to provide combustion products at a sufficiently high temperature that the combustion products can be used to heat the gravitating contiguous mass of pebbles within chamber 38. The gaseous heating material is passed upwardly through the gravitating mass of pebbles within chamber 38 in direct heat exchange with those pebbles, raising the temperature of the pebbles above that desired for the reaction or heating to be carried out within the reaction chamber. Gaseous effluent material is removed from the upper end portion of chamber 38 through effluent outlet conduit 43.

The heated pebbles which, as discussed above, have a temperature gradient formed across their mass are gravitated into the upper end of passage 13 of throat 11. A contiguous gravitating pebble mass is maintained within and throughout the length of throat 11. As the pebbles gravitate downwardly through passageway 13, they reach the enlarged portion thereof and, by the natural flow of gravity, flow across into the passages formed between shell 12 and walls 14 and 15 as well as through the passage formed between walls 14 and 15. Gaseous sealing material such as steam or hydrogen is introduced into the outer passageway portions through conduits 18 and 19, contacting the pebbles which are at a generally higher temperature than those flowing through the central passageway portion. The sealing gas material is raised to a temperature corresponding to that of the pebbles as it flows upwardly through the two outer passageway portions countercurrent to the gravitating flow of pebbles therethrough. When the gaseous material reaches openings 16 and 17, the streams are divided so as to flow through all three of the passageway sections. The pebbles at the generally lower temperature, flowing through the central passageway portion, are contacted with the gaseous material which is at substantially the same temperature as the pebbles in the outer passageway portion. The pebble mass in the central passageway is heated in this direct heat exchange so as to be at a temperature more nearly that of the pebbles in the outer passageway portions. The gaseous material is in some instances removed from throat 11 through outlet conduit 24 and flow control valve 25 or in some instances is allowed to pass upwardly into the lower end portion of pebble heater chamber 38.

The pebbles which have thus been brought to a substantially uniform temperature are gravitated into the upper end portion of chamber 26 and form a contiguous gravitating mass throughout the length thereof. Gaseous material to be heated or reacted within chamber 26 is introduced into the lower end portion of that chamber through conduit 29 and header member 28. The gaseous material passes upwardly in direct heat exchange with and through the mass of gravitating pebbles in that chamber. Gaseous effluent material is removed from the upper end portion of that chamber through effluent conduit 23. Pebbles are removed from the lower end portion of chamber 26 through outlet conduit 31 and are gravitated into the upper end portion of pebble entraining chamber 32. Lift gas is introduced into the lower end of chamber 32, entraining pebbles therein and passes upwardly through elevator conduit 33. The pebbles and lift gas are separated in gas-pebble separator chamber 35, the gaseous material being removed through outlet conduit 36. The pebbles gravitate through conduit 37 into the upper end portion of chamber 38.

Various modifications of this invention will be apparent to those skilled in the art upon study of the accompanying disclosure. These modifications are believed to be within the spirit and the scope of this invention.

I claim:

1. In a pebble throat between two heat exchange chambers of pebble heater apparatus, the improvement which comprises a continuous passage through said throat, the lower portion of said passage being larger in cross-section than the upper portion thereof; at least one imperforate wall member shorter than said enlarged passage portion and extending upwardly from the lower end of said enlarged passage portion so as to divide said enlarged passage portion into an inner and at least one outer section which communicate at their upper ends; a gaseous material aperture through each said wall member intermediate its ends; heating gas inlet means in the lower portion of each said outer passage section, said means being disposed below said gaseous material aperture; and gaseous outlet means from said passage above said wall.

2. The pebble throat of claim 1 wherein two said walls are provided so as to divide said passage into one inner and two outer sections.

3. The pebble heat exchange chamber of claim 1 wherein said wall is circular so as to provide an inner passage section and an annular passage section.

4. The pebble throat of claim 1 wherein said gaseous outlet means extends from the lower portion of said passage of smaller cross section.

5. Improved pebble heater apparatus comprising in combination a first closed, upright, elongated shell; pebble inlet means in the upper end of said shell; gaseous effluent outlet means in the upper end portion of said shell; heating material inlet means in the lower end portion of said shell; a second closed, elongated, upright shell below said first shell; gaseous effluent outlet means in the upper end portion of said second shell; gaseous material inlet means in the lower end portion of said second shell; pebble outlet means in the lower end portion of said second shell; elevator means extending between said pebble outlet means from said second shell to said pebble inlet means in the upper shell; a pebble throat extending between the lower end of said upper shell and the upper end of said second shell, said throat having a smaller upper passage portion and a lower passage portion of larger cross section, at least one wall shorter than said larger passage portion extending upwardly in said larger passage portion from the lower end thereof so as to divide said larger passage portion into an inner and at least one imperforate outer passage section which sections communicate at their upper ends; gaseous material aperture means through each said wall intermediate its ends; gaseous material inlet means extending into each outer passage section, said means being disposed below said gaseous material aperture means; and gaseous effluent outlet means extending from said passage above said wall.

6. The pebble heater apparatus of claim 5 wherein said gaseous effluent outlet means from said throat extends from the lower end portion of said passage portion of smaller cross section.

References Cited in the file of this patent

UNITED STATES PATENTS

| | | |
|---|---|---|
| 1,798,307 | Cooper | Mar. 31, 1931 |
| 1,871,166 | Fahrbach | Aug. 9, 1932 |
| 2,379,195 | Simpson et al. | June 26, 1945 |
| 2,420,376 | Johansson | May 13, 1947 |
| 2,536,254 | Beckberger | Jan. 2, 1951 |
| 2,572,758 | Quigg et al. | Oct. 23, 1951 |